United States Patent
Maley (10) Patent No.: US 12,460,379 B2
(45) Date of Patent: Nov. 4, 2025

(54) COLLISION AVOIDANCE SYSTEM AND METHOD FOR AVOIDING COLLISION OF WORK MACHINE WITH OBSTACLES

(71) Applicant: Caterpillar Inc., Peoria, IL (US)

(72) Inventor: Jacob Maley, Germantown Hills, IL (US)

(73) Assignee: Caterpillar Inc., Peoria, IL (US)

(*) Notice: Subject to any disclaimer, the term of this patent is extended or adjusted under 35 U.S.C. 154(b) by 262 days.

(21) Appl. No.: 17/455,512

(22) Filed: Nov. 18, 2021

(65) Prior Publication Data

US 2023/0151583 A1    May 18, 2023

(51) Int. Cl.
*E02F 9/20* (2006.01)
*B60K 31/00* (2006.01)

(52) U.S. Cl.
CPC ........ *E02F 9/2033* (2013.01); *B60K 31/0008* (2013.01); *B60K 2031/0025* (2013.01); *B60K 2031/0091* (2013.01)

(58) Field of Classification Search
CPC ........ B60K 31/0008; B60K 2031/0025; B60K 2031/0091; E02F 9/2033; E02F 9/262
USPC .......................................................... 701/50
See application file for complete search history.

(56) References Cited

U.S. PATENT DOCUMENTS

| | | | |
|---|---|---|---|
| 5,477,459 A * | 12/1995 | Clegg | G01C 15/002 701/50 |
| 8,239,125 B2 | 8/2012 | Petrie et al. | |
| 8,346,468 B2 | 1/2013 | Emanuel et al. | |
| 9,302,890 B1 | 4/2016 | Vogt et al. | |
| 9,415,976 B2 | 8/2016 | Hermann et al. | |
| 9,914,624 B2 | 3/2018 | Fulton et al. | |
| 2016/0176338 A1* | 6/2016 | Husted | B60Q 9/008 340/435 |
| 2019/0271990 A1 | 9/2019 | Grabbe et al. | |
| 2020/0263385 A1* | 8/2020 | Konda | E02F 3/439 |

(Continued)

FOREIGN PATENT DOCUMENTS

| CN | 108190771 | 6/2018 |
|---|---|---|
| EP | 3409843 A1 | 12/2018 |

(Continued)

OTHER PUBLICATIONS

Written Opinion and International Search Report for Int'l. Patent Appln. No. PCT/US2022/080011, mailed Mar. 9, 2023 (10 pgs).

*Primary Examiner* — Abby J Flynn
*Assistant Examiner* — Sean Patrick Reidy (57) ABSTRACT

A collision avoidance system for a work machine includes at least one sensor configured to generate a signal indicative of a presence of at least one obstacle in a surrounding area of the work machine. The collision avoidance system also includes a controller communicably coupled with the sensor. The controller is configured to receive the signal indicative of the presence of the obstacle in the surrounding area of the work machine from the sensor. The controller is also configured to determine a position of the obstacle relative to the work machine based on the signal received from the sensor. The controller is further configured to generate a control signal to prevent a movement of the work machine, halt the movement of the work machine, or reduce a velocity of the work machine based on the determination of the position of the obstacle.

20 Claims, 3 Drawing Sheets

(56) References Cited

U.S. PATENT DOCUMENTS

| | | | |
|---|---|---|---|
| 2020/0356088 A1* | 11/2020 | Schlacks, IV | G05D 1/0219 |
| 2020/0369264 A1* | 11/2020 | Cheon | B60W 10/184 |
| 2020/0409377 A1* | 12/2020 | Ready-Campbell | G05D 1/0212 |
| 2021/0180291 A1* | 6/2021 | Saiki | E02F 9/205 |
| 2022/0025612 A1* | 1/2022 | Zhang | E02F 9/262 |
| 2022/0242234 A1* | 8/2022 | Favis | G02B 27/0101 |

FOREIGN PATENT DOCUMENTS

| | | |
|---|---|---|
| EP | 3715536 A1 | 9/2020 |
| EP | 3789546 | 3/2021 |
| WO | 2021010249 A1 | 1/2021 |
| WO | 2021085477 A1 | 5/2021 |

* cited by examiner

COLLISION AVOIDANCE SYSTEM AND METHOD FOR AVOIDING COLLISION OF WORK MACHINE WITH OBSTACLES

TECHNICAL FIELD

The present disclosure relates to a collision avoidance system and a method for avoiding collision of a work machine with one or more obstacles.

BACKGROUND

Work machines, such as, excavators, motor graders, loaders, and the like may be used at various construction worksites to perform operations, such as, material removal, transportation, and the like. Such work machines typically operate in highly interactive environments with ground crew moving around the work machine, varying road surfaces being cut and repaired, and barriers and obstacles that need to be navigated by the work machine. It may be challenging for an operator to be aware of such dynamic environments and accordingly navigate the work machine. More particularly, a visibility of the operator may be obstructed by portions of the work machine itself or other obstacles present near the work machine.

In some examples, if the operator is unaware of one or more obstacles that may be present in a path of the work machine, there may be a possibility of a collision between the work machine and the obstacle, which may not be desired. Thus, it may be desirable to have a technique that prevents collision of manual, semi-autonomous, or autonomous work machines with objects present at the worksite to ensure efficient operations at the worksite.

U.S. Pat. No. 9,415,976 describes a crane collision avoidance system. One example includes a load locator to determine a location of a load of a crane and provide the location information to a mapping module. In addition, a map receiver module procures a map of a site and provides the map to the mapping module. A tag scanner scans the site for one or more tags defining an obstacle and provides the obstacle information to a mapping module. The mapping module combines the location information, the map and the obstacle information into a user accessible information package that is displayed on a graphical user interface.

SUMMARY OF THE DISCLOSURE

In one aspect of the present disclosure, a collision avoidance system for a work machine is provided. The collision avoidance system includes at least one sensor configured to generate a signal indicative of a presence of at least one obstacle in a surrounding area of the work machine. The collision avoidance system also includes a controller communicably coupled with the sensor. The controller is configured to receive the signal indicative of the presence of the obstacle in the surrounding area of the work machine from the sensor. The controller is also configured to determine a position of the obstacle relative to the work machine based on the signal received from the sensor. The controller is further configured to generate a control signal to at least one of prevent a movement of the work machine, halt the movement of the work machine, and reduce a velocity of the work machine based on the determination of the position of the obstacle.

In another aspect of the present disclosure, a method for avoiding collision of a work machine with at least one obstacle is provided. The method includes generating, by at least one sensor, a signal indicative of a presence of the at least one obstacle in a surrounding area of the work machine. The method also includes receiving, by the controller, the signal indicative of the presence of the obstacle in the surrounding area of the work machine from the sensor. The method further includes determining, by the controller, a position of the obstacle relative to the work machine based on the signal received from the sensor. The method includes generating, by the controller, a control signal to at least one of prevent a movement of the work machine, halt the movement of the work machine, and reduce a velocity of the work machine based on the determination of the position of the obstacle.

In yet another aspect of the present disclosure, a work machine is provided. The work machine includes a frame. The work machine also includes a plurality of ground engaging members supported by the frame. The work machine further includes a collision avoidance system. The collision avoidance system includes at least one sensor configured to generate a signal indicative of a presence of at least one obstacle in a surrounding area of the work machine. The collision avoidance system also includes a controller communicably coupled with the sensor. The controller is configured to receive the signal indicative of the presence of the obstacle in the surrounding area of the work machine from the sensor. The controller is also configured to determine a position of the obstacle relative to the work machine based on the signal received from the sensor. The controller is further configured to generate a control signal to at least one of prevent a movement of the work machine, halt the movement of the work machine, and reduce a velocity of the work machine based on the determination of the position of the obstacle.

Other features and aspects of this disclosure will be apparent from the following description and the accompanying drawings.

DETAILED DESCRIPTION

Wherever possible, the same reference numbers will be used throughout the drawings to refer to the same or like parts. Wherever possible, corresponding or similar reference numbers will be used throughout the drawings to refer to the same or corresponding parts.

Figure 1:
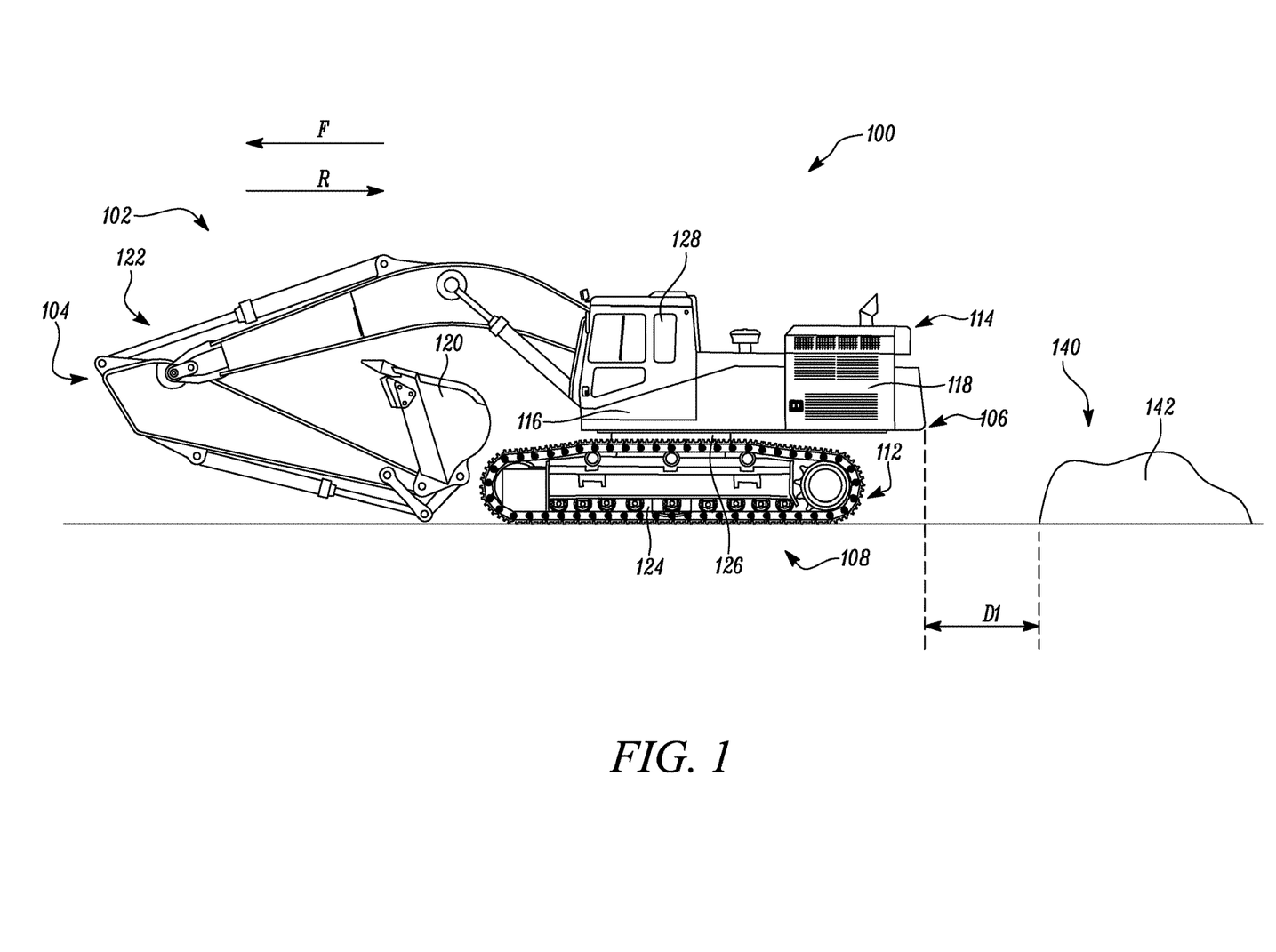
FIG. 1 illustrates a side view of a work machine and an obstacle present around the work machine, according to examples of the present disclosure.

FIG. 1 illustrates an exemplary work machine 100 operating at a worksite 102. The work machine 100 is embodied as a hydraulic excavator herein. Accordingly, the work machine 100 may perform one or more excavation operations at the worksite 102. Although shown as the hydraulic excavator, it may be understood that the work machine 100 may alternatively include other work machines, such as, motor graders, loaders, mining shovels, dozers, tractors, or compactors, without any limitations. Further, the work machine 100 may include a manual machine, an autonomous machine, or a semi-autonomous machine.

The work machine 100 may move in a forward direction "F" or a reverse direction "R". The work machine 100 defines a front end 104 and a rear end 106. Further, the work machine 100 defines a first side 108 embodied as a left side of the work machine 100 in relation to the movement of the work machine 100 in the forward direction "F". Moreover, the work machine 100 defines a second side (not shown) opposite to the first side 108 and embodied as a right side of the work machine 100 in relation to the movement of the work machine 100 in the forward direction "F".

The work machine 100 includes a lower structure 112 and an upper structure 114 movably coupled with the lower structure 112. The work machine 100 includes a frame 116. Specifically, the upper structure 114 defines the frame 116. The upper structure 114 may support various components of the work machine 100 thereon. The upper structure 114 defines an enclosure 118. The enclosure 118 allows mounting of a power source (not shown). The power source may provide operating power to the work machine 100 for mobility and operational requirements. The power source may include, but is not limited to, a diesel engine, a gasoline engine, a gaseous fuel powered engine, a dual fuel powered engine, an electric motor, a fuel cell, a battery, and/or a combination thereof, based on application requirements. Additionally, the work machine 100 may include components (not shown) and/or systems (not shown), such as a braking system, a fuel delivery system, an air delivery system, an exhaust system, a drivetrain, a hydraulic system, a transmission system, and so on, based on application requirements.

The work machine 100 may also include a work implement 120 disposed proximate to the front end 104. The work implement 120 may be operably connected to the upper structure 114 by a linkage assembly 122. The work implement 120 may be used for various material handling operations, material removal operations, and/or material transportation operations. For example, during an excavation operation, the work implement 120 may contact ground surfaces for removing material therefrom.

Further, the work machine 100 includes a number of ground engaging members 124 supported by the frame 116. The ground engaging members 124 may provide support and mobility to the work machine 100 on ground surfaces. As such, the ground engaging members 124 may enable travel/tramming of the work machine 100 on ground surfaces. In the illustrated embodiment of FIG. 1, the work machine 100 includes two ground engaging members 124 (only one ground engaging member 124 is shown in the accompanying figure) disposed at each of the first side 108 and the second side of the work machine 100. In the illustrated example of FIG. 1, the ground engaging members 124 are embodied as tracks. In other examples, the ground engaging members 124 may embody wheels or drums.

The work machine 100 includes a turn table 126. The turn table 126 may be mounted on the lower structure 112, upon which the upper structure 114, including an operator cabin 128, may be pivotally mounted. The operator cabin 128 is supported by the frame 116. The operator cabin 128 may move relative to the lower structure 112. Further, the operator cabin 128 may include one or more input devices 130 (shown in FIG. 2). The input devices 130 may include a lever, a pedal, a button, a joystick, and the like. In some examples, the input devices 130 may include a first sensor 132 associated therewith. Further, the sensor 132 may include a single sensor or a combination of sensors. The first sensor 132 may embody a position sensor that may generate a signal "I1" indicative of a position of a corresponding input device 130. For example, if the input device 130 is being used to effectuate a movement of the linkage assembly 122 or the work implement 120 towards the first side 108 or the second side of the work machine 100, the signal "I1" from the first sensor 132 may indicate if the linkage assembly 122 or the work implement 120 is moving towards or is disposed at the first side 108 or the second side of the work machine 100. In another example, if the input device 130 is being used to effectuate a movement of the ground engaging members 124, the signal "I1" from the first sensor 132 may indicate if the ground engaging members 124 are moving in the forward direction "F" or the reverse direction "R".

Figure 2:
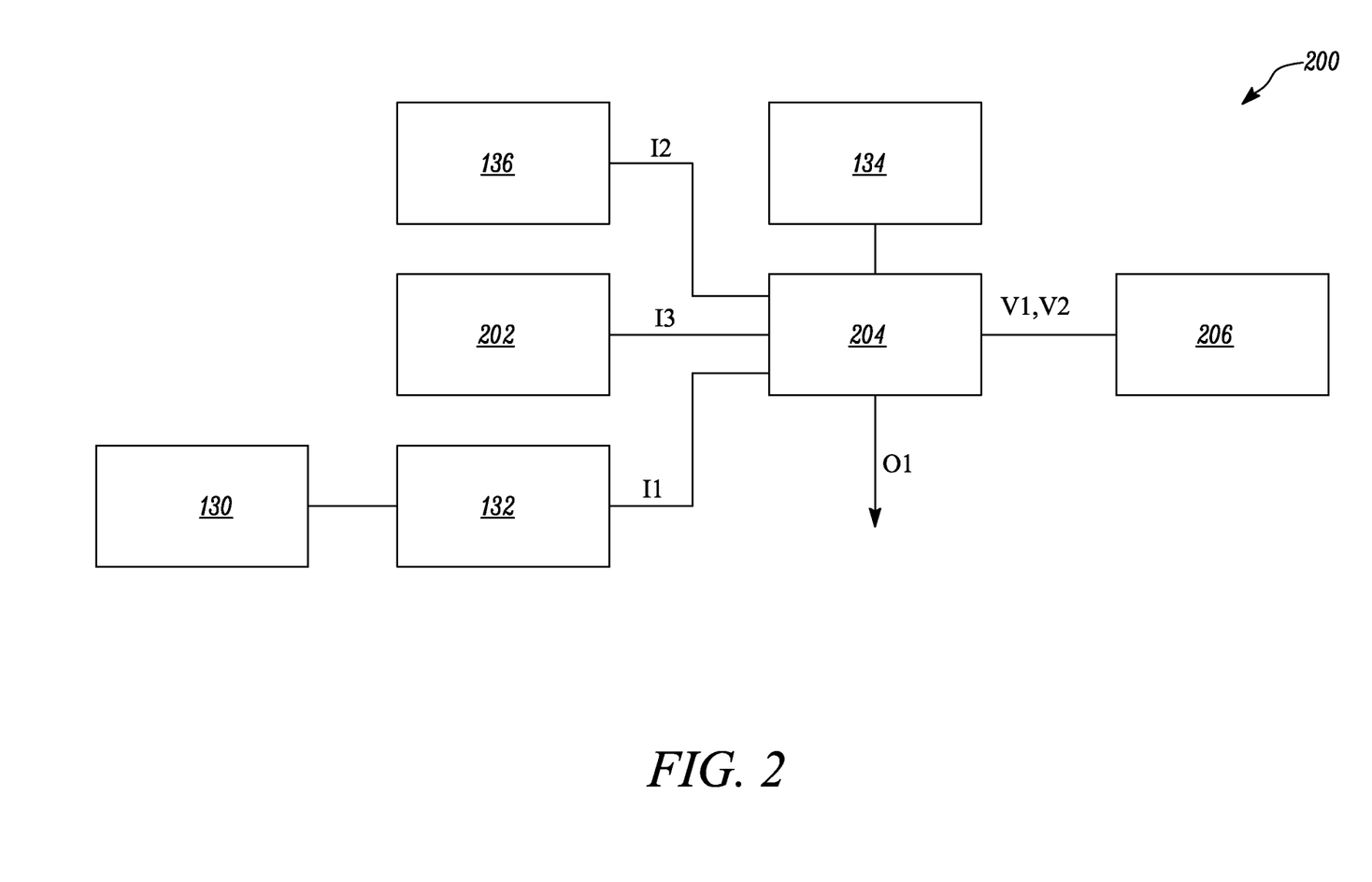
FIG. 2 illustrates a block diagram of a collision avoidance system associated with the work machine of FIG. 1, according to examples of the present disclosure.

Moreover, the operator cabin 128 may include one or more output devices 134 (shown in FIG. 2). In an example, the output device 134 may include a display screen. In some examples, the output device 134 may embody a touch screen device that may include means to provide outputs to the machine operator and may also include means to receive inputs, that may be physical inputs or virtual inputs, from the machine operator. In some examples, the input and output devices 130, 134 may be present at a base station (not shown) which may be located remotely with respect to the work machine 100. For example, the input and output devices 130, 134 may be disposed at the base station that may be located offsite.

Further, the work machine 100 may include a second sensor 136 (shown in FIG. 2) that generates signals "I2" indicative of a direction of movement of one or more movable components of the work machine 100. Further, the sensor 136 may include a single sensor or a combination of sensors. The second sensor 136 may include an inertial measurement unit (IMU). The IMU may be mounted at any location on the linkage assembly 122, the work implement 120, the upper structure 114, the lower structure 112, and the like. In an example, the second sensor 136 may include a gyroscopic device. In some examples, the second sensor 136 may include a swing angle sensor.

Further, the second sensor 136 may be mounted on the linkage assembly 122 or the work implement 120, such that the second sensor 136 generates the signals "I2" indicative of the swing movement of the linkage assembly 122 or the work implement 120. Furthermore, the second sensor 136 may be mounted on the ground engaging members 124, such that the second sensor 136 generates the signals "I2" indicative of the direction of the movement of the ground engaging members 124. In some examples, the second sensor 136 may be mounted on the turn table 126, such that the second sensor 136 generates the signals "I2" indicative of the movement of the upper structure 114 relative to the lower structure 112. It should be noted that a type of the second sensor 136 mentioned herein does not limit the scope of the present disclosure and the work machine 100 may include any other type of sensor that may provide the desired features.

As shown in FIG. 2, the present disclosure relates to a collision avoidance system 200 for a work machine 100. The collision avoidance system 200 includes one or more sensors 202 to generate a signal "I3" indicative of a presence of one or more obstacles 142 (shown in FIG. 1) in a surrounding area 140 (shown in FIG. 1) of the work machine 100. The obstacle 142 may include an infrastructure, another work machine, a pile of material, a personnel, and the like. Although a single obstacle 142 embodied as a pile of material is illustrated in FIG. 1, it should be noted that the worksite 102 (see FIG. 1) may include multiple obstacles of different shapes and sizes present thereon. It should be further noted that, although the obstacle 142 are positioned on the ground surface herein, it may be contemplated that the worksite 102 may include overhead or hanging obstacles that may be either in a suspended form, such as, cranes, or may be movable obstacles, such as, drones, without any limitations.

Further, as shown in FIG. 2, the sensor 202 may include a single sensor or a combination of sensors. The sensor 202 may be mounted on the work machine 100. For example, the sensor 202 may be mounted on the upper structure 114 (see FIG. 1) of the work machine 100. In an example, the sensor 202 may be mounted on top of the operator cabin 128 (see FIG. 1) of the work machine 100. In some examples, the sensor 202 may include one or more of a perception sensor and a proximity sensor. In an example, the sensor 202 may include an image capturing device. More particularly, the sensor 202 may embody a camera mounted on the work machine 100. The image capturing device may include any other type of device generally known in the art, such as, a camcorder, a closed-circuit television (CCTV), and the like. In an example, the image capturing device may include a digital video camera, such as, an ethernet camera to provide an electronic motion picture acquisition. In some examples, the image capturing device may embody monocular lens cameras or a combination of monocular lens cameras and stereo/triple lens cameras, without any limitations. It should be noted that the present disclosure is not limited by a type of the image capturing device. Further, the work machine 100 may include a single image capturing device or multiple image capturing devices mounted at different locations on the work machine 100. The image capturing device may be used to sense the surrounding area 140 of the work machine 100. For example, the image capturing device may capture images or videos of the surrounding area 140 of the work machine 100.

In other examples, the sensor 202 may embody a Light Detection and Ranging (LiDAR) sensor or a Radio Detection and Ranging (RADAR) sensor, without any limitations. In some examples, the sensor 202 may include a combination of the image capturing device, the LiDAR sensor, and the RADAR sensor. It should be noted that the present disclosure is not limited by a type of the sensor 202, and the sensor 202 may include any type of sensor that provides the desired functionalities. In an example, the signals "I3" generated by the sensor 202 may be used to determine a distance "D1" (shown in FIG. 1) between the obstacle 142 and the work machine 100 or a bearing angle of the obstacle 142 from the work machine 100. In some examples, the distance "D1" may be defined between the obstacle 142 and the frontmost portion of the work machine 100.

Further, the collision avoidance system 200 includes a controller 204 communicably coupled with the sensor 202. The controller 204 may be present onboard the work machine 100. In an example, the controller 204 may embody a central control unit associated with the work machine 100 that may be capable of controlling numerous machine functions. Alternatively, the controller 204 may embody an off-board controller. The controller 204 may embody a single microprocessor or multiple microprocessors for receiving various input signals from various components of the work machine 100. Numerous commercially available microprocessors may be configured to perform the functions of the controller 204. The controller 204 may include a central processing unit, a graphics processing unit, and the like. The controller 204 may also include a processing logic, such as, a field-programmable gate array (FPGA), an application-specific integrated circuit (ASIC), and the like.

The controller 204 includes a memory 206. The memory 206 may include a flash memory, a random-access memory (RAM), an electrically erasable programmable read-only memory (EEPROM), and the like. The memory 206 may be used to store data, such as, algorithms, instructions, arithmetic operations, and the like. The controller 204 may execute various types of digitally-stored instructions, such as, a software or an algorithm, retrieved from the memory 206, or a firmware program which may enable the controller 204 to perform a wide variety of operations.

The controller 204 receives the signal "I3" indicative of the presence of the obstacle 142 in the surrounding area 140 of the work machine 100 from the sensor 202. Further, the controller 204 determines a position of the obstacle 142 relative to the work machine 100 based on the signal "I3" received from the sensor 202. In some examples, the controller 204 may determine the position of the obstacle 142 based on the analysis of the signal "I3" received from the sensor 202. In an example, when the sensor 202 includes the image capturing device, the controller 204 may determine the position of the obstacle 142 based on a mounting position of the image capturing device i.e., a height and an angle at which the image capturing device is mounted. Additionally, the controller 204 may analyze the obstacle 142 in a field of the view of the image capturing device. Based on the analysis, the controller 204 may determine the distance "D1" between the obstacle 142 and the work machine 100 or the bearing angle of the obstacle 142 from the work machine 100. It should be noted that the parameters i.e., the distance "D1" and the bearing angle mentioned herein are exemplary in nature and the controller 204 may determine the position of the obstacle 142 based on other parameters not mentioned herein, without any limitations.

Further, the controller 204 generates a control signal "O1" to prevent a movement of the work machine 100, halt the movement of the work machine 100, or reduce a velocity of the work machine 100 based on the determination of the position of the obstacle 142. The controller 204 may generate the control signal "O1" based on one or more of the distance "D1" between the obstacle 142 and the work machine 100 and the bearing angle of the obstacle 142 from the work machine 100.

It should be further noted that the controller 204 may compare the position of the work machine 100 with the direction of movement of one or more movable components of the work machine 100 for generating the control signal "O1". The movable components may include the linkage assembly 122 (see FIG. 1), the work implement 120 (see FIG. 1), the ground engaging members 124 (see FIG. 1), the upper structure 114, etc. For this purpose, the controller 204 may be in communication with the first sensor 132 and the second sensor 136. In some examples, the controller 204 may determine the direction of movement of the work machine 100 itself for generating the control signal "O1". In some examples, data received from the first and/or second sensors 132, 136 may assist the controller 204 in determining the direction of movement of the one or more movable components of the work machine 100. For example, when the obstacle 142 may be present at the first side 108 (see FIG. 1) of the work machine 100, and the linkage assembly 122 is swinging towards the first side 108 of the work machine 100, the first and/or second sensor 132, 136 may generate the signals "I1", "I2" indicating the movement of the linkage assembly 122 towards the first side 108. Based on the signals "I1", "I2" received from the first and/or second sensors 132, 136 indicating the movement of the linkage assembly 122 towards the first side 108 and the signals "I3" received from the sensor 202 indicating the presence of the obstacle 142 on the first side 108, the controller 204 may generate the control signal "O1" to prevent the movement, halt the movement, or reduce the velocity of the work machine 100.

In some examples, the controller 204 may compare the distance "D1" between the obstacle 142 and the work machine 100 with a predetermined distance value "V1" between the obstacle 142 and the work machine 100 for generating the control signal "O1". The predetermined distance value "V1" may be stored within the memory 206 associated with the controller 204 and may be retrieved from the memory 206 as and when required. Further, the controller 204 may generate the control signal "O1" if the distance "D1" between the obstacle 142 and the work machine 100 is less than the predetermined distance value "V1" between the obstacle 142 and the work machine 100.

Further, the controller 204 may generate the control signal "O1" to halt the movement of the work machine 100 or reduce the velocity of the work machine 100 based on the position of the obstacle 142. For example, if the distance "D1" between the work machine 100 and the obstacle 142 is greater than a predefined value "V2", the controller 204 may generate the control signal "O1" to reduce the velocity of the work machine 100. It should be noted that the velocity of the work machine 100 may be determined based on the distance "D1" between the obstacle 142 and the work machine 100 and/or the bearing angle of the obstacle 142 from the work machine 100.

However, if the distance "D1" between the work machine 100 and the obstacle 142 is lesser than the predefined value "V2", the controller 204 may generate the control signal "O1" to halt the movement of the work machine 100. The predefined value "V2" between the work machine 100 and the obstacle 142 may be stored within the memory 206 associated with the controller 204 and may be retrieved from the memory 206 as and when required. It should be noted that the predetermined distance value "V1" and the predefined value "V2" may be decided on a variety of factors, such as, a size of the work machine 100, a terrain at the worksite 102, a size of the worksite 102, and the like. In some examples, the machine operator may be able to adjust the predetermined distance value "V1" and the predefined value "V2", as per application requirements.

Further, in some examples, the controller 204 may determine the position of the obstacle 142 before initiating the movement of the work machine 100. In such an example, the controller 204 may generate the control signal "O1" to prevent the movement of the work machine 100 based on the determination of the position of the obstacle 142. More particularly, in a situation wherein the work machine 100 is about to move in the forward direction "F" and the controller 204 determines a presence of the obstacle 142 proximate to the front end 104 of the work machine 100, the controller 204 may generate the control signal "O1" to prevent the movement of the work machine 100 in the forward direction "F". It should be noted that the data corresponding to the movement of the work machine 100 in the forward direction "F" may be received from the first or second sensor 132, 136.

Moreover, in some examples, the controller 204 may determine the position of the obstacle 142 during the movement of the work machine 100. In such an example, the controller 204 may generate the control signal "O1" to halt the movement of the work machine 100 or reduce the velocity of the work machine 100 based on the determination of the position of the obstacle 142. More particularly, in a situation wherein the work machine 100 is moving in the reverse direction "R" and the controller 204 determines a presence of the obstacle 142 proximate to the rear end 106 (see FIG. 1) of the work machine 100, the controller 204 may generate the control signal "O1" to halt the movement of the work machine 100 or reduce the velocity of the work machine 100 while the work machine 100 is moving in the reverse direction "R". It should be noted that the data corresponding to the movement of the work machine 100 or the movable components of the work machine 100 may be received from the first and/or second sensors 132, 136.

Further, the control signal "O1" generated by the controller 204 may be transmitted to the braking system of the work machine 100, the transmission system of the work machine 100, the drivetrain of the work machine 100, or any other component of the work machine 100 that may allow control of the movement of the work machine 100, without any limitations. In some examples, the velocity of the work machine 100 may be controlled based on a control of the ground engaging members 124. In such examples, the control signal "O1" may be transmitted to components, such as, hydraulic valves or hydraulic motors, that may operate the ground engaging members 122, so that the work machine 100 may move at a desired velocity. In some examples, the controller 214 may generate the first control signal "O1" to control a velocity of one or more movable components of the work machine 100.

In some examples, the collision avoidance system 200 may allow an operator to override the control signal "O1" generated by the controller 204. In such examples, the controller 204 may generate a prompt screen on the output device 134. The prompt screen may include an option to continue with a control of the work machine 100 based on the control signal "O1" generated by the controller 204 or override the control signal "O1" generated by the controller 204.

If the machine operator chooses to continue with the control of the work machine 100, the controller 204 may control the movement of the work machine 100 based on the generated control signal "O1". However, if the machine operator chooses to override the control signal "O1", the controller 204 may not intervene with the movements of the work machine 100. It should be noted that the machine operator may choose to override the control signal "O1" in situations wherein the obstacle 142 is small in size, the machine operator may be able to easily navigate the work machine 100 around the obstacle 142, and the like.

INDUSTRIAL APPLICABILITY

Figure 3:
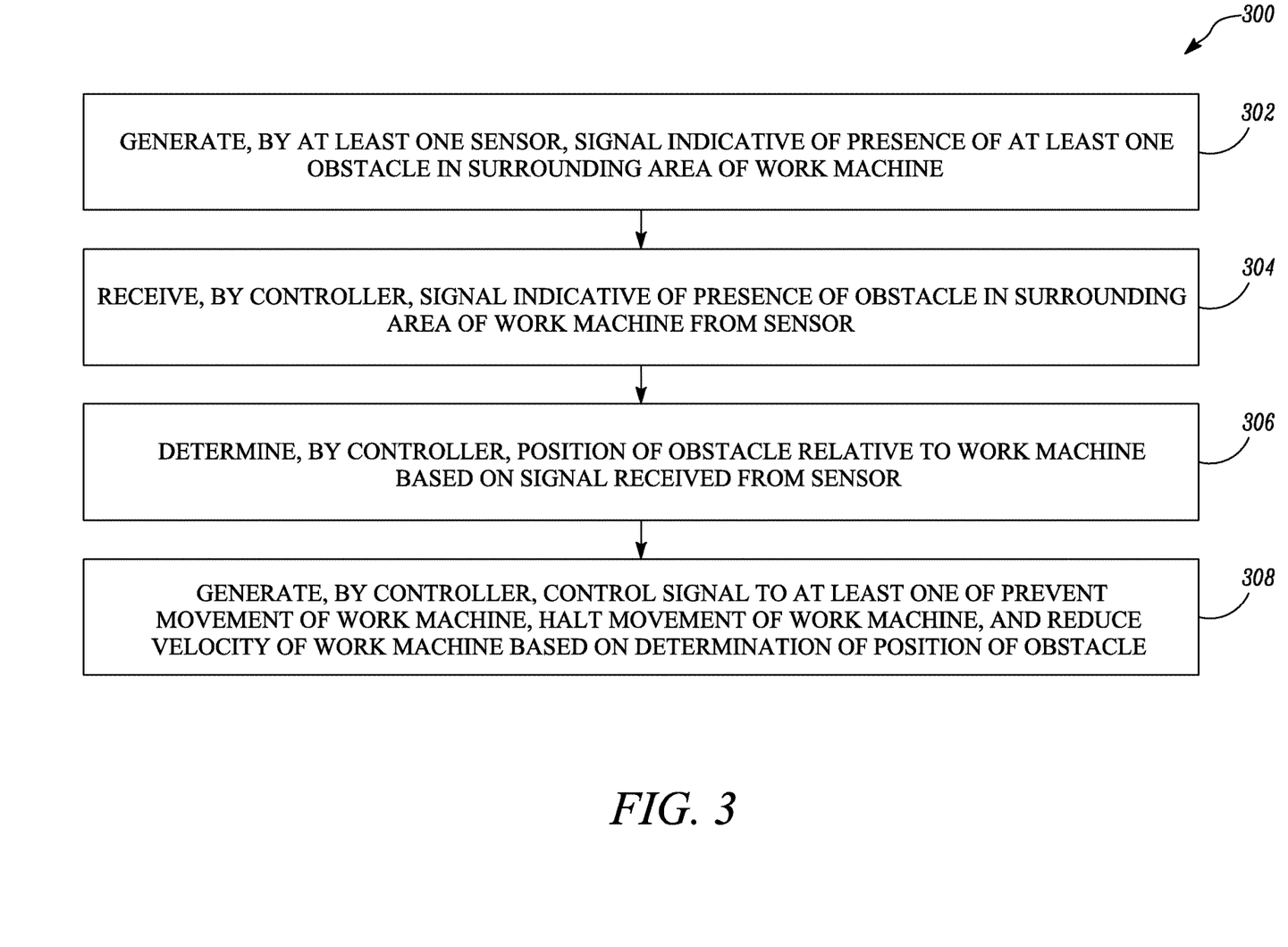
FIG. 3 illustrates a flowchart for a method for avoiding collision of the work machine with one or more obstacles, according to examples of the present disclosure.

The present disclosure relates to the collision avoidance system 200 and a method 300 for avoiding collision of the work machine 100 with one or more obstacles 142. The collision avoidance system 200 may collect real time and accurate information regarding the presence of one or more obstacles 142 around the work machine 100 and accordingly control the movements of the work machine 100 to eliminate any possibility of collision between the obstacle 142 and the work machine 100. The collision avoidance system 200 may provide 360 Degrees viewability around the work machine 100. More particularly, the collision avoidance system 200 may include the one or more sensors 202 that may provide real time data of one or more obstacles 142 that may be present around the work machine 100. Further, in some examples, the collision avoidance system 200 may allow the machine operator to override the control signal "O1" generated by the controller 202, as per requirements.

The collision avoidance system 200 may increase operational safety of the work machine 100 by providing a means to monitor the surrounding area 140 of the work machine 100 and may also take appropriate actions based on detection of the one or more obstacles 142. The collision avoidance system 200 may be simple in operation and cost effective. Further, the collision avoidance system 200 may be easily retrofitted on existing work machines, without modifying hardware associated with existing work machines. The collision avoidance system 200 may be used with autonomous, semi-autonomous, or manual machines, without any limitations. Further, the collision avoidance system 200 may embody an inclusive and onboard machine system as the collision avoidance system 200 may not require additional inputs from other work machines or other sensors present at the worksite 102.

FIG. 3 illustrates a flowchart for the method 300 for avoiding collision of the work machine 100 with one or more obstacles 142. At step 302, the one or more sensors 202 generate the signal "I3" indicative of the presence of the one or more obstacles 142 in the surrounding area 140 of the work machine 100. The sensor 202 may be mounted on the work machine 100. Further, the sensor 202 may include one or more of the perception sensor and the proximity sensor. At step 304, the controller 204 receives the signal "I3" indicative of the presence of the obstacle 142 in the surrounding area 140 of the work machine 100 from the sensor 202. At step 306, the controller 204 determines the position of the obstacle 142 relative to the work machine 100 based on the signal "I3" received from the sensor 202

At step 308, the controller 204 generates the control signal "O1" to prevent the movement of the work machine 100, halt the movement of the work machine 100, or reduce the velocity of the work machine 100 based on the determination of the position of the obstacle 142. Further, the controller 204 may generate the control signal "O1" based on one or more of the distance "D1" between the obstacle 142 and the work machine 100 and the bearing angle of the obstacle 142 from the work machine 100. Furthermore, the controller 204 may compare the position of the work machine 100 with the direction of movement of one or more movable components of the work machine 100 for generating the control signal "O1". Moreover, the controller 204 may generate the control signal "O1" if the distance "D1" between the obstacle 142 and the work machine 100 is less than the predetermined distance value "V1" between the obstacle 142 and the work machine 100.

In an example, the controller 204 may determine the position of the obstacle 142 before initiating the movement of the work machine 100. Further, the controller 204 may generate the control signal "O1" to prevent the movement of the work machine 100 based on the determination of the position of the obstacle 142. In another example, the controller 204 may determine the position of the obstacle 142 during the movement of the work machine 100. Further, the controller 204 may generate the control signal "O1" to halt the movement of the work machine 100 or reduce the velocity of the work machine 100 based on the determination of the position of the obstacle 142.

It may be desirable to perform one or more of the steps shown in FIG. 3 in an order different from that depicted. Furthermore, various steps could be performed together.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

The invention claimed is:

1. A collision avoidance system for a work machine comprising:
   a plurality of ground engaging members operated by an actuator comprising at least one of a motor and a valve;
   at least one sensor configured to generate a signal indicative of a presence of at least one obstacle in a surrounding area of the work machine; and
   a controller communicably coupled with the sensor, wherein the controller is configured to:
      receive the signal indicative of the presence of the obstacle in the surrounding area of the work machine from the sensor;
      determine a position of the obstacle relative to the work machine based on the signal received from the sensor;
      generate a control signal;
      using the control signal, cause the actuator to engage one or more of the plurality of the ground engaging members based on the determination of the position of the obstacle;
      determine when the position of the obstacle relative to the work machine is greater than a first predetermined distance and less than a second predetermined distance;
      reduce a velocity of an implement of the work machine, with the control signal, based on the position of the obstacle being greater than the first predetermined distance and less than the second predetermined distance;
      halt movement of the implement of the work machine, with the control signal, based on the determination of the obstacle being less than the first predetermined distance;
      adjust the first predetermined distance or the second predetermined distance;
      cause display of a prompt screen that relates to the control signal, wherein the prompt screen includes a visual indication of the control signal;
      accept, via physical operator input an operator instruction to override the control signal; and
      in response to the operator instruction to override the control signal, cease causing the actuator to engage the one or more of the plurality of the ground engaging members.

2. The collision avoidance system of claim 1, wherein the sensor is mounted on the work machine, and wherein the sensor includes at least one of a perception sensor and a proximity sensor.

3. The collision avoidance system of claim 1, wherein the controller is further configured to:
   determine positions of a plurality of obstacles before initiating the movement of the work machine; and
   generate the control signal to prevent the movement of the work machine based on the determination of the positions of the plurality of obstacles.

4. The collision avoidance system of claim 1, wherein the controller is further configured to:
   determine the position of the obstacle during the movement of the work machine; and generate the control signal to at least one of halt the movement of the work machine and reduce the velocity of the work machine based on the determination of the position of the obstacle.

5. The collision avoidance system of claim 1, wherein the controller is further configured to generate the control signal further based on a bearing angle of the obstacle from the work machine.

6. The collision avoidance system of claim 5, wherein the controller is further configured to determine the bearing angle of the obstacle from the work machine according to the signal, the signal being generated from an image capturing device.

7. The collision avoidance system of claim 1, wherein the controller is further configured to compare the position of the work machine with a direction of movement of one or more movable components of the work machine for generating the control signal.

8. The collision avoidance system of claim 1, wherein the adjusting of the first predetermined distance or the second predetermined distance is performed based on input from an operator.

9. A method for avoiding collision of a work machine, the work machine comprising a plurality of ground engaging members operated by an actuator comprising at least one of a motor and a valve, with at least one obstacle, the method comprising:
generating, by at least one sensor, a signal indicative of a presence of the at least one obstacle in a surrounding area of the work machine;
receiving, by a controller, the signal indicative of the presence of the obstacle in the surrounding area of the work machine from the sensor;
determining, by the controller, a position of the obstacle relative to the work machine based on the signal received from the sensor;
generating, by the controller, a control signal;
using the control signal, causing the actuator to engage one or more of the plurality of the ground engaging members based on the determination of the position of the obstacle;
determining when the position of the obstacle relative to the work machine is greater than a first predetermined distance and less than a second predetermined distance;
adjusting the first predetermined distance or the second predetermined distance;
reducing, after the adjusting, a velocity of an implement of the work machine with the control signal based on the position of the obstacle being greater than the first predetermined distance and less than the second predetermined distance; and
causing display of a prompt screen that relates to the control signal, wherein the prompt screen includes a visual indication of the control signal;
accepting, via physical operator input, an operator instruction to override the control signal; and
in response to the operator instruction to override the control signal, cease causing the actuator to engage the one or more of the plurality of the ground engaging members.

10. The method of claim 9, wherein the sensor is mounted on the work machine, and wherein the sensor includes at least one of a perception sensor and a proximity sensor.

11. The method of claim 9 further comprising:
determining, by the controller, the position of the obstacle before initiating movement of the work machine; and
generating, by the controller, the control signal to prevent the movement of the work machine based on the determination of the position of the obstacle.

12. The method of claim 9 further comprising:
determining, by the controller, the position of the obstacle during movement of the work machine; and
generating, by the controller, the control signal to reduce the velocity of the work machine based on the determination of the position of the obstacle.

13. The method of claim 9 further comprising generating, by the controller, the control signal further based on a bearing angle of the obstacle from the work machine.

14. The method of claim 8 further comprising comparing, by the controller, the position of the work machine with a direction of movement of one or more movable components of the work machine for generating the control signal.

15. A work machine comprising:
a frame;
a plurality of ground engaging members supported by the frame and operated by an actuator, the actuator comprising at least one of a valve and a motor; and
a collision avoidance system comprising:
at least one sensor configured to generate a signal indicative of a presence of at least one obstacle in a surrounding area of the work machine at a worksite; and
a controller communicably coupled with the sensor, wherein the controller is configured to:
receive the signal indicative of the presence of the obstacle in the surrounding area of the work machine from the sensor;
determine a position of the obstacle relative to the work machine based on the signal received from the sensor;
generate a control signal to cause the actuator to engage one or more of the plurality of the ground engaging members based on the determination of the position of the obstacle;
determine when the position of the obstacle relative to the work machine is greater than a first predetermined distance and less than a second predetermined distance, the first predetermined distance or the second predetermined distance being set based on terrain of the worksite or size of the worksite;
reduce a velocity of an implement of the work machine, via the control signal, based on the position of the obstacle being greater than the first predetermined distance and less than the second predetermined distance;
halt movement of the implement of the work machine, via the control signal, based on the determination of the obstacle being less than the first predetermined distance;
cause display of a prompt screen that relates to the control signal;
display a visual indication of the control signal;
accept, via physical operator input, an operator instruction to override the control signal; and
in response to the operator instruction to override the control signal, cease causing the actuator to engage the one or more of the plurality of the ground engaging members.

16. The work machine of claim 15, wherein the controller is further configured to:
determine the position of the obstacle before initiating the movement of the work machine; and generate the control signal to prevent the movement of the work machine based on the determination of the position of the obstacle.

17. The work machine of claim 15, wherein the controller is further configured to:
   determine the position of the obstacle during the movement of the work machine; and
   generate the control signal to at least one of halt the movement of the work machine and reduce the velocity of the work machine based on the determination of the position of the obstacle.

18. The work machine of claim 15, wherein the controller is further configured to generate the control signal based on at least one of a distance between the obstacle and the work machine and a bearing angle of the obstacle from the work machine.

19. The work machine of claim 18, wherein the controller is further configured to generate the control signal if the distance between the obstacle and the work machine is less than a predetermined distance value between the obstacle and the work machine.

20. The work machine of claim 15, wherein the controller is further configured to compare the position of the work machine with a direction of movement of one or more movable components of the work machine for generating the control signal.

* * * * *